United States Patent
Ignaczak et al.

(10) Patent No.: US 10,824,882 B1
(45) Date of Patent: Nov. 3, 2020

(54) SYSTEMS AND METHODS FOR IMPROVING VEHICLE PARKING SKILLS

(71) Applicant: Ford Global Technologies, LLC, Dearborn, MI (US)

(72) Inventors: Brad Ignaczak, Canton, MI (US); Cheri Lyn Hansen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/571,001

(22) Filed: Sep. 13, 2019

(51) Int. Cl.
*G06K 9/00* (2006.01)
*G08G 1/14* (2006.01)
*B60W 40/09* (2012.01)

(52) U.S. Cl.
CPC ......... *G06K 9/00798* (2013.01); *B60W 40/09* (2013.01); *G06K 9/00805* (2013.01); *G08G 1/143* (2013.01)

(58) Field of Classification Search
CPC ........... G06K 9/00798; G06K 9/00805; G08G 1/143; B60W 40/09
USPC ....................................................... 340/576
See application file for complete search history.

(56) References Cited

U.S. PATENT DOCUMENTS

| | | | |
|---|---|---|---|
| 9,359,009 B2 | 6/2016 | Ignaczak et al. | |
| 10,255,808 B2 | 4/2019 | Bostick et al. | |
| 10,262,217 B2 | 4/2019 | Cohen et al. | |
| 2012/0191343 A1* | 7/2012 | Haleem | G01C 21/3461 701/431 |
| 2015/0266509 A1* | 9/2015 | Ignaczak | B60W 50/14 701/1 |
| 2015/0344028 A1 | 12/2015 | Gieseke et al. | |
| 2016/0110650 A1* | 4/2016 | Basir | G06N 20/00 706/14 |

OTHER PUBLICATIONS

Reddy, et al. (2014). Design and Development of Low Cost Automatic Parking Assistance System, pp. 1-6.

* cited by examiner

*Primary Examiner* — Emily C Terrell
*Assistant Examiner* — Sharmin Akhter
(74) *Attorney, Agent, or Firm* — Frank Lollo; Eversheds Sutherland (US) LLP (57) ABSTRACT

Exemplary embodiments described in this disclosure are generally directed to systems and methods for improving vehicle parking skills. In an exemplary implementation, one or more cameras that are mounted in a vehicle may be used to capture a set of images when the vehicle is parked in a parking spot. The images may include a portion of the vehicle, a portion of another vehicle parked in an adjacent parking spot, an object located outside the parking spot, and/or one or more lines that delineate the parking spot. The images may be processed by a computer to determine distance parameters between the vehicle and items such as the other vehicle, the object located outside the parking spot, and/or the lines of the parking spot. A parking skills grade may then be assigned by the computer, to a driver of the vehicle, based on the distance parameters.

15 Claims, 9 Drawing Sheets

SYSTEMS AND METHODS FOR IMPROVING VEHICLE PARKING SKILLS

FIELD OF THE DISCLOSURE

This disclosure generally relates to vehicles and more particularly relates to systems and methods for improving parking skills of a driver of a vehicle.

BACKGROUND

Parking spots are typically defined by lines painted on the ground and drivers use these lines to park their vehicles inside the parking spots. A good driver may park a vehicle inside a parking spot in a manner that provides adequate clearance on all sides of the vehicle. For example, adequate clearance may be provided between the parked vehicle and another vehicle parked in an adjacent parking spot so as to allow opening of a door of either vehicle without causing damage to the other vehicle. However, some drivers may lack the skills to park in this manner. For example, a driver may park a vehicle in a parking spot at an improper angle, thereby causing some parts of the vehicle to be undesirably close to another vehicle parked in an adjacent parking spot. As another example, a driver may park a vehicle in a parking spot such that a part of the vehicle protrudes into an adjacent parking spot, thereby preventing the use of the adjacent parking spot by another vehicle.

The lack of skills on the part of such drivers may be attributable to various reasons such as carelessness, time pressures, and lack of experience. Nonetheless, at least some of these drivers may desire to improve their parking skills. One way to do so is by trial-and-error methods. However, such methods can be time consuming and frustrating if no guidance or supervision is provided to the driver by an experienced mentor. Consequently, another way to improve parking skills is to seek the advice of a mentor. However, in at least some cases, coaching provided by a mentor may be undesirable because a mentor may, knowingly or unknowingly, pass on one or more bad habits and techniques of the mentor. For example, a poor mentor may teach an inexperienced driver to park in a manner that ensures that no damage is done to the driver's vehicle even if it causes inconvenience to others, such as, for example, straddling two parking spots. It is therefore desirable to provide solutions that can offer improvements to the parking skills of a driver in a consistent and logical manner.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are generally directed to systems and methods for improving vehicle parking skills of a driver. In an exemplary implementation, one or more cameras that are mounted in a vehicle may be used to capture a set of images (or a single image) when the vehicle is parked in a parking spot. The images can include a portion of the vehicle, another vehicle parked in an adjacent parking spot, an object (such a wall or a fire hydrant) located outside the parking spot, and/or one or more lines that delineate the parking spot. The images may be processed by a computer in order to determine various distance parameters between the vehicle and various items such as the other vehicle, the object located outside the first parking spot, and/or the lines of the parking spot. A parking skills grade may then be assigned by the computer, to a driver of the vehicle, based on the distance parameters.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "a parking spot" as used in this disclosure refers to one or more of various types of spaces designated for parking a vehicle, and is intended to encompass various alternative phrases such as "a parking space," "a parking slot," or "a parking area." The parking spot is typically indicated by lines painted on a road surface, a parking garage, a parking lot, or any other surface upon which a vehicle may be parked. The word "vehicle" as used in this disclosure should be understood to encompass alternative words such as "automobile" and "car." Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

Figure 1:
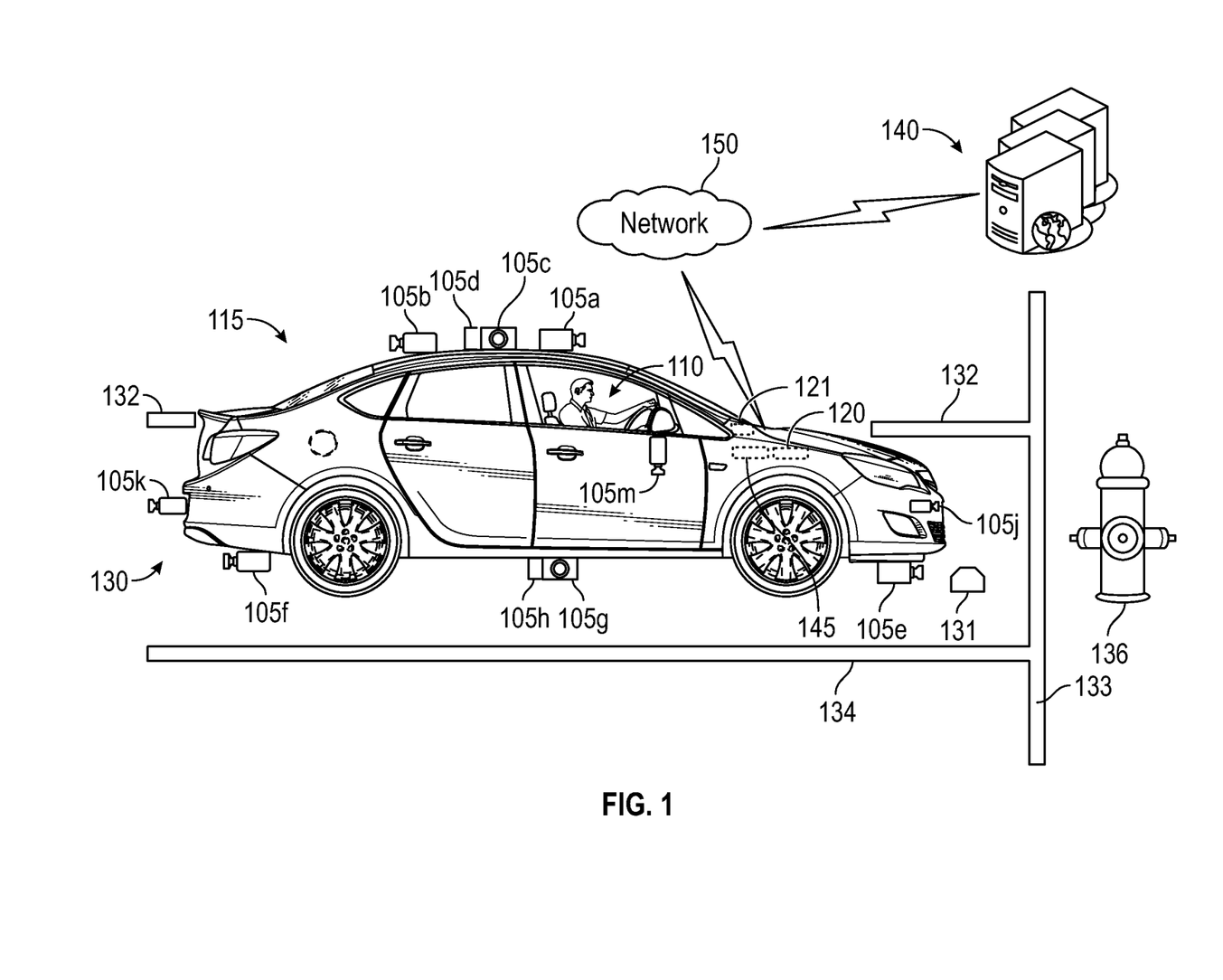
FIG. 1 shows an exemplary embodiment of a parking skills improvement system provided in a vehicle in accordance with an exemplary embodiment of the disclosure.

FIG. 1 shows an exemplary embodiment of a parking skills improvement system provided in a vehicle 115 in accordance with an exemplary embodiment of the disclosure. The vehicle 115 may include a computer 120 that is configured to execute various actions in accordance with the disclosure, a vehicle computer 145, an infotainment system 121, and an imaging system 105. The computer 120 may be a standalone computer that is provided in the vehicle 115 or may be a part of the vehicle computer 145. The computer 120 may be communicatively coupled to the vehicle computer 145 and/or to a server computer 140. A network 150 may be used to communicatively couple the computer 120 to the server computer 140. The network 150 may include any one, or a combination of networks, such as a local area network (LAN), a wide area network (WAN), a telephone network, a cellular network, a cable network, a wireless network, and/or private/public networks such as the Internet. For example, the network 150 may support communication technologies such as Bluetooth, cellular, near-field communication (NFC), Wi-Fi, Wi-Fi direct, machine-to-machine communication, and/or man-to-machine communication. At least one portion of the network 150 can include a wireless communication link that allows the server computer 140 to wirelessly communicate with the computer 120 in the vehicle 115. The server computer 140 may cooperate with the computer 120 to carry out some operations associated with the parking skills improvement system. For example, the server computer 140 may be used to store some kinds of data generated by the computer 120 (images, for example), to provide some kinds of data to the computer 120 (vehicle data, for example), and/or to perform certain types of computations (mathematical calculations, for example).

The infotainment system 121 can be an integrated unit that includes various components such as a radio, a CD player, a video player, and a navigation system. In an exemplary implementation, the infotainment system 121 may include a display having a graphical user interface (GUI) for use by a driver 110 of the vehicle 115. The driver may, for example, use the GUI to request guidance from the navigation system to travel to a desired destination. The driver may also use the GUI to interact with the computer 120 for obtaining information about his/her parking skills and/or for obtaining coaching in order to improve his/her parking skills. The infotainment system 121 may also be used to display various images captured by the imaging system 105. For example, the infotainment system 121 may be used to display images of objects behind the vehicle 115 when the driver 110 has placed a gear shifter of the vehicle 115 in reverse.

The imaging system 105 can include one or more of various types of cameras mounted on various parts of the vehicle 115 and communicatively coupled to the computer 120. The computer 120 may control various operations of the cameras of the imaging system 105, such as initiating capture of images, and processing of the captured images. In one exemplary implementation, the imaging system 105 can include at least one video camera that captures and propagates video content (a video clip, for example) to the computer 120. In another exemplary implementation, the imaging system can include at least one digital camera, such as a digital single lens reflex (DSLR) camera, that captures digital pictures and propagates the digital pictures to the computer 120. In yet another exemplary implementation, the imaging system can include a combination of at least one video camera and at least one DSLR camera.

In the exemplary embodiment shown in FIG. 1, the vehicle 115 is parked in a parking spot 130 and the imaging system 105 includes a first set of cameras 105a, 105b, 105c, and 105d mounted upon a top surface of a roof of the vehicle 115. One or more of the first set of cameras may be mounted upon some other parts of the vehicle, such as, for example, above a license plate of the vehicle 115 or behind a front grille of the vehicle 115. In some implementations, some or all of the cameras of the first set of cameras 105a, 105b, 105c, and 105d may be omitted.

Each of the first set of cameras 105a, 105b, 105c, and 105d may be oriented to capture images in one of various directions. More particularly, the camera 105a may be used to capture images of objects located in front of the vehicle 115 and/or a portion of a front end of the vehicle 115. For example, the camera 105a may be arranged to capture an image that includes a portion of a hood of the vehicle 115 and a fixture such as a fire hydrant 136, located on a sidewalk in front of the vehicle 115. The captured image can be propagated to the computer 120 to allow the computer 120 to perform certain operations in accordance with the disclosure, such as determining a distance between the front end of the vehicle 115 and the fire hydrant 136.

The camera 105b of the imaging system 105 may be used to capture images of objects located behind the vehicle 115 and/or certain parts of the vehicle 115. For example, the camera 105b may be arranged to capture an image that includes a rear end of the vehicle 115 (a portion of the trunk, for example) and an object such as a vehicle (not shown) parked in a parking spot behind the parking spot 130. The captured image can be propagated to the computer 120 to allow the computer 120 to perform certain operations in accordance with the disclosure, such as determining a distance between the rear end of the vehicle 115 and a front end of the other vehicle.

The camera 105c may be used to capture images of objects located on a passenger side of the vehicle 115. For example, the camera 105c may be arranged to capture an image of a vehicle (not shown) parked in a parking spot adjacent to the parking spot 130 on the passenger side. The captured image can be propagated to the computer 120 to allow the computer 120 to perform certain operations in accordance with the disclosure, such as determining a distance between the passenger side of the vehicle 115 and a driver side of the other vehicle parked in the adjacent parking spot.

The camera 105*d* may be used to capture images of objects located on a driver side of the vehicle 115. For example, the camera 105*d* may be arranged to capture an image of a vehicle (not shown) parked in a parking spot adjacent to the parking spot 130 on the driver side. The captured image can be propagated to the computer 120 to allow the computer 120 to perform certain operations in accordance with the disclosure, such as determining a distance between the driver side of the vehicle 115 and a passenger side of the other vehicle parked in the adjacent parking spot.

The imaging system 105 may also include a second set of cameras 105*e*, 105*f*, 105*g*, and 105*h* mounted underneath the vehicle 115, such as upon a bottom surface of a floor of the vehicle 115. In some implementations, some or all of the cameras of the second set of cameras 105*e*, 105*f*, 105*g*, and 105*h* may be omitted. Each camera of the second set of cameras 105*e*, 105*f*, 105*g*, and 105*h* may be oriented to capture images in various directions. More particularly, the camera 105*e* may be used to capture images of objects located below a front portion of the vehicle 115. For example, the camera 105*e* may be used to capture an image of a curb 131 that is located ahead of the front tires of the vehicle 115.

In an exemplary implementation, the camera 105*e* may be configured to capture an image of the curb 131, which may be located either below or ahead of the vehicle 115, depending on the manner in which the vehicle 115 is parked. The image may include a bottom portion of a front bumper of the vehicle 115. The captured image can be processed by the computer 120 to determine a relative distance between the front bumper of the vehicle 115 and the curb 131. The distance information may then be used by the computer 120 to determine whether the vehicle 115 has been parked in an appropriate manner inside the parking spot 130 and with respect to the curb 131.

In another exemplary implementation, the camera 105*e* can be configured to capture an image of the bottom portion of a front bumper of the vehicle 115 and a line 133 that is a part of the painted lines of the parking spot 130. The captured image can then be processed by the computer 120 to determine a relative distance between the front bumper of the vehicle 115 and the line 133. The distance information may be used by the computer 120 to determine whether the vehicle 115 has been parked in an appropriate manner inside the parking spot 130 or has a rear end protruding outside the parking spot 130 in an undesirable manner.

The camera 105*f* of the imaging system 105 may be used to capture images of objects located behind the vehicle 115 and/or certain parts of the vehicle 115. For example, the camera 105*f* may be arranged to capture an image that includes a rear bumper of the vehicle 115 and an end portion of each of a line 132 and a line 134 that are painted lines of the parking spot 130. The captured image can be propagated to the computer 120 to allow the computer 120 to perform certain operations such as determining a relative distance between the rear bumper of the vehicle 115 and an end portion of the parking spot 130 as defined by the line 132 and the line 134. The distance information may be used by the computer 120 to determine whether the vehicle 115 has been parked in an appropriate manner inside the parking spot 130 or is protruding outside the parking spot 130 in an undesirable manner.

The camera 105*g* may be used to capture images of objects located on a passenger side of the vehicle 115. For example, the camera 105*g* may be arranged to capture an image of the line 134 that is a painted line of the parking spot 130. The captured image can be propagated to the computer 120 to allow the computer 120 to perform certain operations such as determining whether the vehicle 115 has been parked outside the line 134 and is occupying a portion of a parking spot that is adjacent to the parking spot 130, on the passenger side of the vehicle 115.

The camera 105*h* may be used to capture images of objects located on a driver side of the vehicle 115. For example, the camera 105*h* may be arranged to capture an image of the line 132 that is a painted line of the parking spot 130. The captured image can be propagated to the computer 120 to allow the computer 120 to perform certain operations such as determining whether the vehicle 115 has been parked outside the line 132 and is occupying a portion of another parking spot adjacent to the parking spot 130 on the driver side of the vehicle 115.

In some implementations, the imaging system 105 may employ a 360-degree camera system in place of, or in addition to, one or both of the first set of cameras 105*a*, 105*b*, 105*c*, and 105*d* and the second set of cameras 105*e*, 105*f*, 105*g*, and 105*h*. The 360-degree camera system typically includes a camera 105*j* that is mounted behind the front grille of the vehicle 115, a camera 105*k* that is mounted under or above a license plate located on a tailgate of the vehicle 115, a camera 105*l* (not shown) that is mounted in a side view mirror on the driver side of the vehicle 115, and a camera 105*m* that is mounted in a side view mirror on the passenger side of the vehicle 115. Images captured by the 360-degree camera system can be displayed on the infotainment system 121 in one of various display formats. One exemplary display format offers a 360-degree view that combines images captured by all the cameras of the 360-degree camera system. The driver 110 may use the 360-degree view to comprehensively observe traffic in front of the vehicle 115, behind the vehicle 115, and on both sides of the vehicle 115. Another exemplary display format provides a view of traffic behind and on both sides of the vehicle 115.

Images captured by some or all of the cameras of the 360-degree camera system can be propagated to the computer 120 to allow the computer 120 to perform various operations such as determining whether the vehicle 115 has been parked inside the parking spot 130; determining a clearance between the vehicle 115 and an object in front of, or behind, the vehicle 115; and/or determining clearances with respect to one or more vehicles parked in adjacent parking spots. Such operations may be directed at evaluating the parking skills of the driver 110 in accordance with the disclosure.

Figure 2:
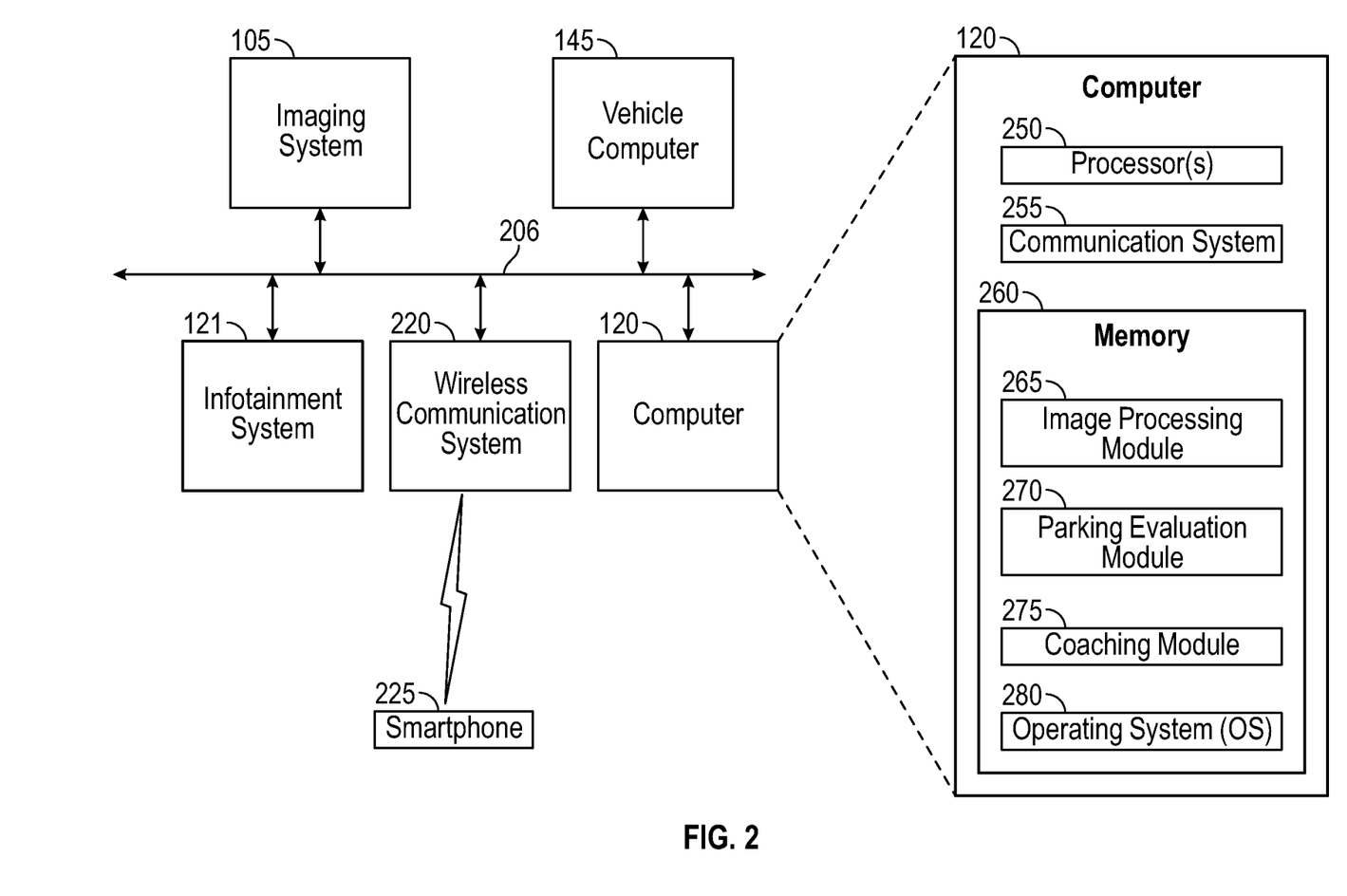
FIG. 2 shows some exemplary components that may be included in a vehicle having a parking skills improvement system in accordance with an exemplary embodiment of the disclosure.

FIG. 2 shows some exemplary components that may be included in the vehicle 115 in accordance with an exemplary embodiment of the disclosure. The exemplary components may include the computer 120, the imaging system 105, the vehicle computer 145, and the infotainment system 121 that are described above. The exemplary components may further include a wireless communication system 220 that may use one or more communication technologies such as Bluetooth, cellular, near-field communication (NFC), Wi-Fi, Wi-Fi direct, machine-to-machine communication, and/or man-to-machine communication to communicate with devices such as a smartphone 225. At least some of the information generated by the computer 120 in accordance with the disclosure may be wirelessly transmitted by the wireless communication system 220 for display on the smartphone 225. The information may also be displayed on the infotainment system 121.

The various components are communicatively coupled to each other via one or more buses such as an exemplary bus 206. The bus 206 may be implemented using various wired and/or wireless technologies. For example, the bus 206 can be an Ethernet bus, or can be a vehicle bus that uses a controller area network (CAN) bus protocol, a Media Oriented Systems Transport (MOST) bus protocol, and/or a CAN flexible data (CAN-FD) bus protocol. Some or all portions of the bus 206 may also be implemented using wireless technologies such as Wi-Fi, Bluetooth®, Zigbee®, or near-field-communications (NFC).

The computer 120 may include a processor 250, a communication system 255, and a memory 260. The communication system 255 can include a transceiver that allows the computer 120 to communicate with the imaging system 105 via the bus 206, for operations such as receiving images captured by the imaging system 105. The communication system 255 may also include a wireless transceiver that allows the computer 120 to transmit/receive information to/from the server computer 140, using an Internet communications format (when the network 150 is the Internet) and/or a cellular communications format (when the network 150 is a cellular network).

The memory 315, which is one example of a non-transitory computer-readable medium, may be used to store an operating system (OS) 280, and code modules such as an image processing module 265, a parking evaluation module 270, and a coaching module 275. The code modules are provided in the form of computer-executable instructions that can be executed by the processor 250 for performing various operations for assessing and improving the parking skills of the driver 110 of the vehicle 115 in accordance with the disclosure.

In one exemplary implementation, the parking evaluation module 270 may be executed by the processor 250 for performing a procedure to assess the parking skills of the driver 110. The procedure may be initiated by the parking evaluation module 270 cooperating with the communication system 255 and certain components of the vehicle 115 to first determine whether the driver has placed the vehicle 115 in a parked condition. Accordingly, the parking evaluation module 270 may configure the communication system 255 to communicate with the vehicle computer 145 and/or one or more sensors provided in the vehicle 115. The vehicle computer 145, which can also provide the parked condition information, is typically configured to obtain data from the sensors in order to execute various functions of the vehicle 115. Exemplary sensors can include a gear shift position sensor, a parking brake sensor, and an engine ignition key sensor, each of which can provide an indication that the vehicle 115 is in a parked condition.

Upon confirming that the vehicle 115 is in a parked condition, the parking evaluation module 270 may instruct the communication system 255 to communicate with the imaging system 105 for obtaining one or more images. Accordingly, some or all of the second set of cameras 105e, 105f, 105g, and 105h may be activated in order to capture images of parts of the vehicle 115 (front bumper, rear bumper, etc.) and/or the lines of the parking spot 130. The captured images may be received in the computer 120 and processed by the image processing module 265 for determining various distance parameters such as, for example, a distance between the front bumper of the vehicle 115 and the line 133, a distance between a passenger side edge of the vehicle 115 and the line 134, and so on. In at least some cases, the image processing module 265 may use an edge seeking algorithm to identify various peripheral portions of the vehicle 115 such as an outside edge of the front bumper, an outside edge of the rear bumper, and/or an outside edge of a passenger door. The edge seeking algorithm may also be used to identify edges of various objects such as the fire hydrant 136.

The results of the processing carried out by the image processing module 265 may be conveyed to the parking evaluation module, which may use various techniques to determine the distance parameters such as, for example, curve fitting techniques, line segmenting techniques, linearization techniques, approximation techniques, and mathematical formulae. In one exemplary implementation, the distance parameters that are determined from the captured images may be compared against an idealized parking model that indicates optimal distances between the vehicle 115 and the lines of the parking spot 130 and/or between the vehicle 115 and various objects such as, for example, the fire hydrant 136, a portion of a building (a wall, for example), and a vehicle parked in the adjacent parking spot.

The parking evaluation module 270 may use the results of the comparison to assign a parking skills grade to the driver 110 of the vehicle 115. The assigned parking skills grade may be displayed to the driver 110 via the infotainment system 121 and/or the smartphone 225. The parking skills grade can be provided in various formats. In a first exemplary implementation, the parking skills grade can be a numerical value, such as, for example, a number in a range between 1 and 100 (percentage) or a number between 1 and 10 (10 indicating a highest ranking and 1 a lowest ranking). In a second exemplary implementation, the parking skills grade can be a percentile value such as, for example, a parking skills grade corresponding to the 95-percentile bracket or a 25-percentile bracket. In a third exemplary implementation, the parking skills grade can be a message such as, for example, "excellent parking," or "room for improvement on parking skills."

Also displayed on the infotainment system 121, and/or the smartphone 225, may be additional material provided by the coaching module 275 such as, coaching instructions and/or guidance to improve the parking skills of the driver 110. The coaching instructions may be based on various factors such as the images captured by the imaging system 105 when the vehicle 115 has been parked in the parking spot 130, and/or the parking skills grade assigned to the driver 110.

In another exemplary implementation in accordance with the invention, the coaching instructions may be based on a set of images and/or a video clip, captured by the imaging system 105 when the driver 110 is maneuvering the vehicle 115 into the parking spot 130 prior to parking. Processing these images can provide to the computer 120, information pertaining to various actions performed by the driver 110 prior to stopping the vehicle 115 in the parking spot 130. For example, the driver 110 may have driven the vehicle 115 into the parking spot 130 at a sub-optimal angle and/or at an improper speed.

In an exemplary method for generating coaching instructions, the coaching module 275 may instruct the imaging system 105 (via the communication system 255) to capture images of the parking spot 130 and objects located in the vicinity of the parking spot 130 over a period of time when the driver 110 is maneuvering the vehicle 115 into the parking spot 130. In one case, the captured images may be in the form of a video clip. The coaching module 275 may process the video clip to determine a trajectory of the vehicle 115 from a first location outside the parking spot 130 to a second location inside the parking spot 130. In one case, the second location inside the parking spot 130 can correspond to a spot where the vehicle 115 is stopped and the engine turned off. In another case, the second location inside the parking spot 130 can correspond to a spot where the vehicle 115 is still moving prior to stopping.

The trajectory of the vehicle 115 may provide various types of information pertaining to the parking skills of the driver 110. For example, the parking skills of the driver 110 may be poor if the trajectory includes one or more angles that prevents the vehicle 115 from being parked optimally within the lines of the parking spot 130.

Figure 3:
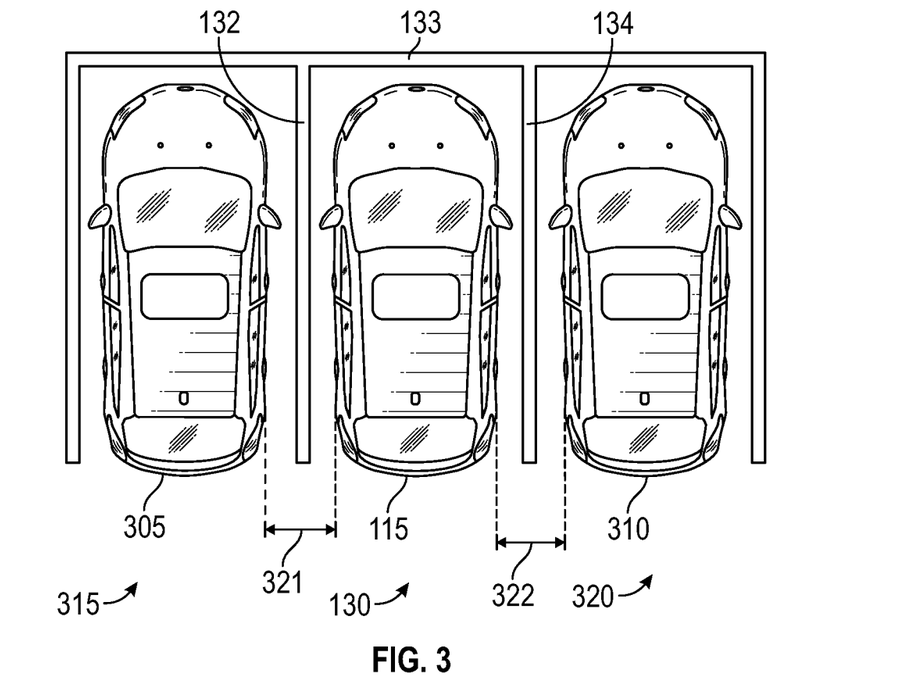
FIG. 3 shows a first exemplary parked condition that may be addressed by use of a parking skills improvement system in accordance with the disclosure.

FIG. 3 shows a first exemplary parked condition that may be addressed by use of a parking skills improvement system in accordance with the disclosure. In this first exemplary parked condition, the vehicle 115 is parked in the parking spot 130 in between a vehicle 305 parked in a parking spot 315 that is adjacent to a first side of the parking spot 130 and a vehicle 310 parked in a parking spot 320 that is adjacent to a second side of the parking spot 130. In accordance with one of the exemplary methods described above, the parking evaluation module 270 may process an image (or images) provided by the imaging system 105 to determine various distance parameters such as, for example, a distance between the front bumper of the vehicle 115 and the line 133 that is one of the painted lines of the parking spot 130, a distance between a passenger side edge of the vehicle 115 and the line 134 that is another one of the painted lines of the parking spot 130, and so on.

In this example, a front bumper of the vehicle 115 does not extend beyond the line 133 that is a part of the painted lines of the parking spot 130. The rear bumper of the vehicle 115 does not extend beyond an end portion of each of the line 132 and the line 134. The driver side edge of the vehicle 115 does not overlap the line 132 and is substantially parallel to the line 132. Furthermore, the driver side of the vehicle 115 has a clearance 321 with respect to a passenger side of the vehicle 305. The passenger side of the vehicle 115 does not overlap the line 134 and is substantially parallel to the line 134. Furthermore, the passenger side of the vehicle 115 has a clearance 322 with respect to a driver side of the vehicle 310.

The parking evaluation module 270 may also take into consideration factors such as the make and model of the vehicle 115 when evaluating the parked condition of the vehicle 115. Such information may be obtained by the computer 120 from the server computer 140, for example. The make and model of the vehicle 115 can provide an indication of the dimensions of the vehicle 115 such as a length and a width of the vehicle 115, and can also provide information pertaining to various features of the vehicle 115, such as whether the vehicle 115 is a 2-door model or a 4-door model, a ground clearance of the vehicle 115, and a protrusion distance of side view mirrors.

The parking evaluation module 270 may use this information when processing the image(s) of the vehicle 115 in the parked condition. For example, the parking evaluation module 270 may use length information of the vehicle 115 to evaluate the position of the front bumper of the vehicle 115 with respect to line 133 and of the rear bumper of the vehicle 115 with respect to an end portion of each of the line 132 and the line 134. The width information and side mirror protrusion information may be used to evaluate the clearance 321 and the clearance 322 between the vehicle 115 and the vehicles parked in the adjacent parking spots. Based on the evaluation, the parking evaluation module 270 may assign a high parking skills grade to the driver 110 of the vehicle 115.

Figure 4:
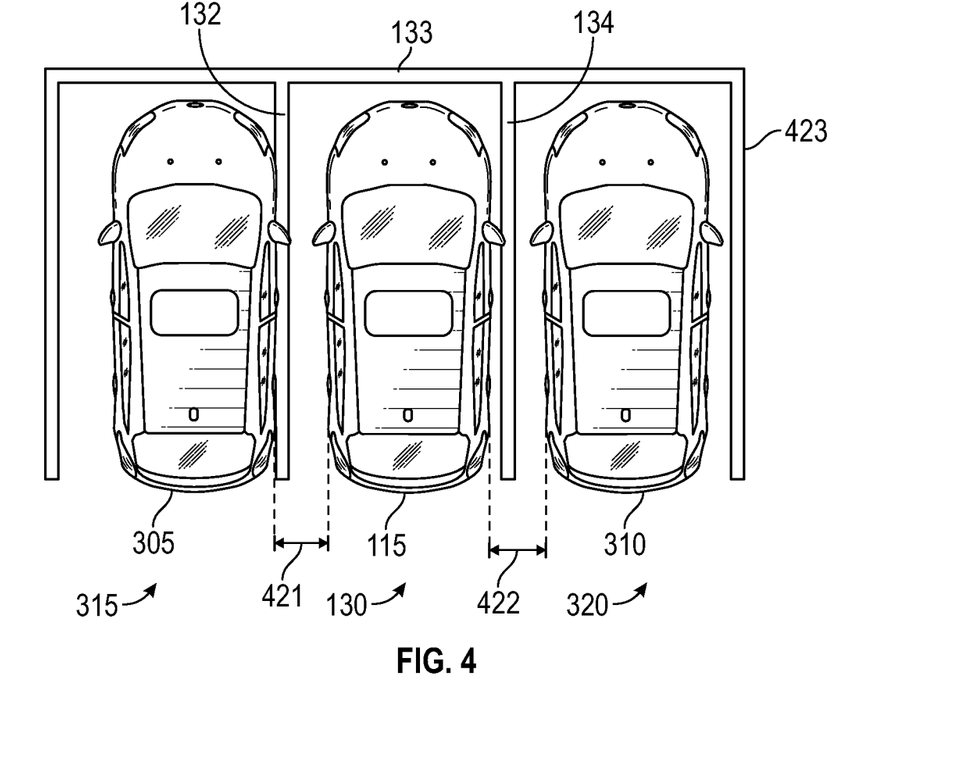
FIG. 4 shows a second exemplary parked condition that may be addressed by use of a parking skills improvement system in accordance with the disclosure.

FIG. 4 shows a second exemplary parked condition that may be addressed by use of a parking skills improvement system in accordance with the disclosure. In this second exemplary parked condition, the vehicle 115 is parked in the parking spot 130 between the vehicle 305 and the vehicle 310. The vehicle 310 is parked midway between the line 134 and the line 423 that are painted lines of the parking spot 320. However, the vehicle 305 is parked in a manner whereby a passenger side of the vehicle 305 straddles the line 132 and intrudes into the parking spot 130.

The driver side of the vehicle 115 has a clearance 421 with respect to the passenger side of the vehicle 305 that is smaller than the clearance 321 shown in the first parked condition illustrated in FIG. 3. A clearance 422 between the passenger side of the vehicle 115 and the driver side of the vehicle 310 is also smaller than the clearance 322 shown in the first parked condition illustrated in FIG. 3. However, the driver 110 of the vehicle 115 has parked the vehicle 115 substantially midway between the vehicle 305 and the vehicle 310. The parking evaluation module 270 may assign a high parking skills grade to the driver 110 of the vehicle 115 because the driver 110 has parked the vehicle 115 based on the position of the vehicle 305 and the vehicle 310 rather than on the location of the painted lines of the parking spot 130. Use of the painted lines in this situation to park midway between the line 132 and the line 134 would not allow adequate clearance to open a door on the driver side of the vehicle 115 without the door making contact with the passenger side of the vehicle 305.

Figure 5:
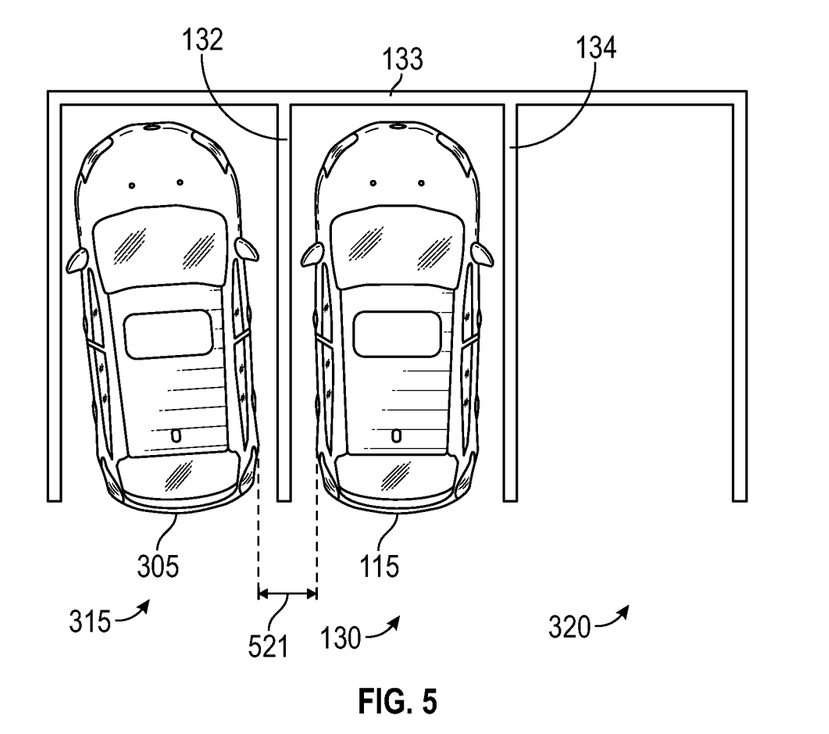
FIG. 5 shows a third exemplary parked condition that may be addressed by use of a parking skills improvement system in accordance with the disclosure.

FIG. 5 shows a third exemplary parked condition that may be addressed by use of a parking skills improvement system in accordance with the disclosure. In this third exemplary parked condition, the parking spot 320 is unoccupied. The vehicle 305 is parked in the parking spot 315 at an angle. A rear portion of the vehicle 305 is closer to the line 132 than a front portion of the vehicle 305. In this case, the driver 110 of the vehicle 115 has parked the vehicle 115 substantially midway between the line 132 and the line 134 based on the painted lines of the parking spot 130. The parking evaluation module 270 may assign a high parking skills grade to the driver 110 of the vehicle 115 for parking in this manner because the clearance 521 is adequate to allow opening any door on the driver side of the vehicle 115 without bringing the door in contact with the passenger side of the vehicle 305. The clearance 521 is also adequate to allow opening of any door on the passenger side of the vehicle 305 without bringing the door in contact with a driver side of the vehicle 115.

Figure 6:
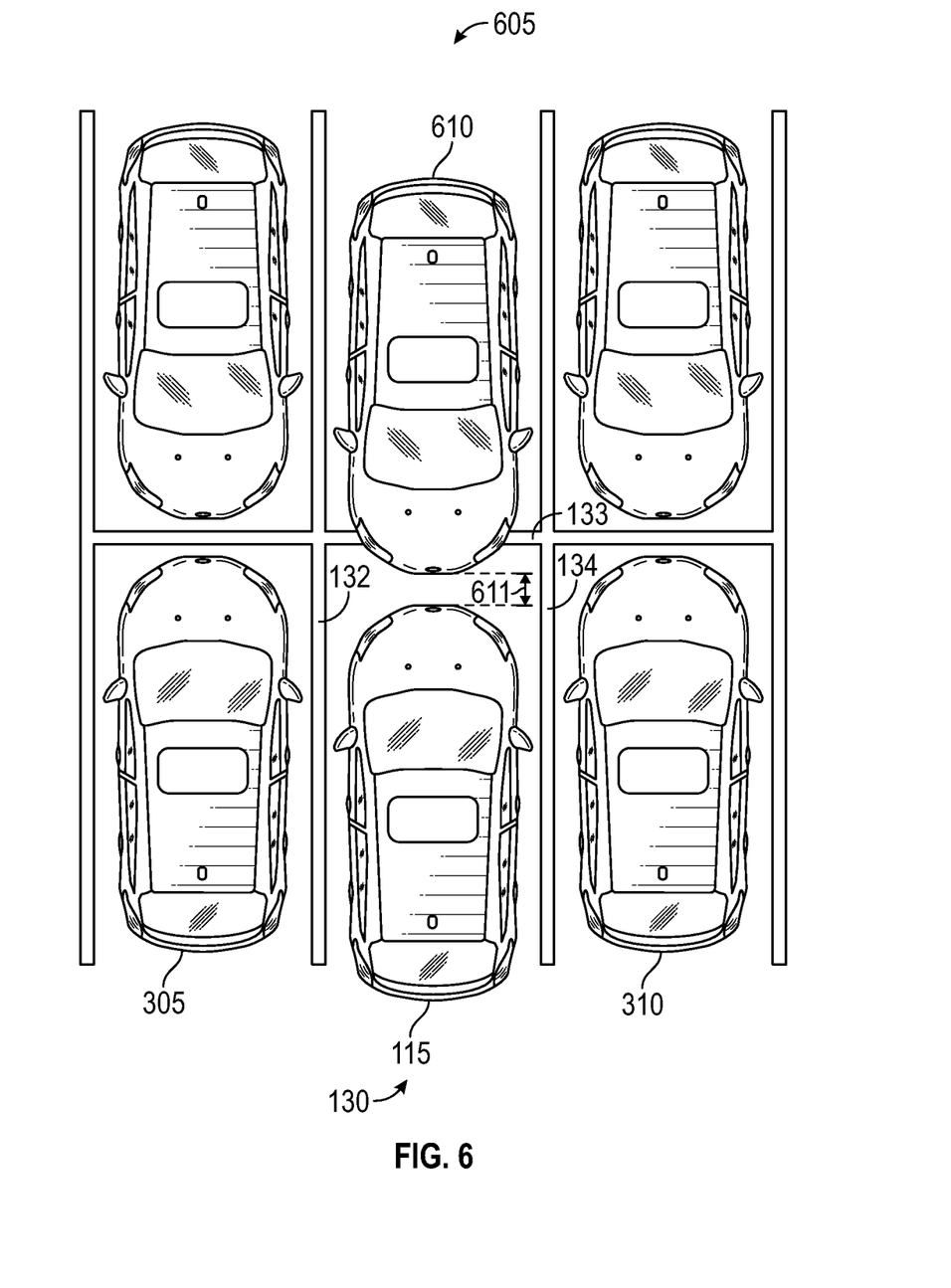
FIG. 6 shows a fourth exemplary parked condition that may be addressed by use of a parking skills improvement system in accordance with the disclosure.

FIG. 6 shows a fourth exemplary parked condition that may be addressed by use of a parking skills improvement system in accordance with the disclosure. In this fourth exemplary parked condition, the vehicle 115 is parked substantially midway between the vehicle 305 parked in the parking spot 315 and the vehicle 310 parked in the parking spot 320, and also midway between the line 132 and the line 134 of the parking spot 130. The parking evaluation module 270 may determine the various distance parameters between the three vehicles and conclude that the vehicle 115 is parked in an optimal manner with respect to the vehicle 305 and the vehicle 310. However, in this case a vehicle 610 is parked in a parking spot 605 that longitudinally abuts the parking spot 130. A front end of the vehicle 610 is protruding beyond the line 133 and into the parking spot 130. The driver 110 of the vehicle 115 has taken note of the protruding front end of the vehicle 610 and parked the vehicle 610 in such a manner as to provide a clearance 611 between the front end of the vehicle 115 and the front end of the vehicle 610. The driver 110 has also determined that the clearance 611 is optimal based on his/her knowledge of the length of the vehicle 115 so as to avoid (or at least minimize) a protrusion of the rear end of the vehicle 115 beyond the end portion of each of the line 132 and the line 134 that are painted lines of the parking spot 130.

Figure 7:
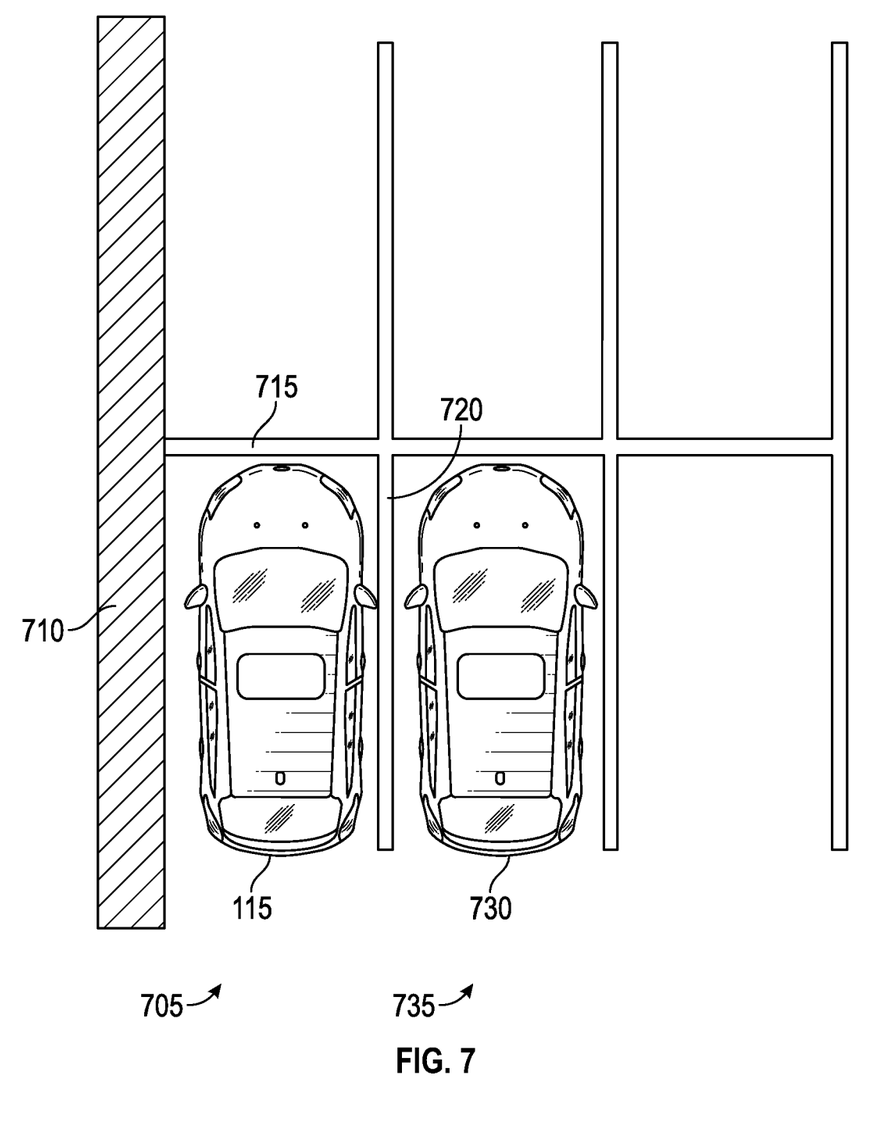
FIG. 7 shows a fifth exemplary parked condition that may be addressed by use of a parking skills improvement system in accordance with the disclosure.

FIG. 7 shows a fifth exemplary parked condition that may be addressed by use of a parking skills improvement system in accordance with the disclosure. In this fifth exemplary parked condition, the vehicle 115 is parked in a parking spot 705 that is located next to a wall 710. The driver 110 of the vehicle 115 has paid attention to the wall 710 as well as a vehicle 730 that is parked in a parking spot 735 adjacent to the parking spot 705. The driver 110 has then made a judgement as to a first amount of clearance that may be desirable between the driver side of the vehicle 115 and the wall 710 and a second amount of clearance between a passenger side of the vehicle 115 and a driver side of the vehicle 730. Based on this judgment, the driver 110 has parked the vehicle 115 substantially midway between the wall 710 and the driver side of the vehicle 730 rather than midway between the wall 710 and the line 720. The driver 110 has also parked the front end of the vehicle 115 behind the line 715 in a manner that avoids the rear end of the vehicle protruding out of the parking spot 705. The parking evaluation module 270 may determine the various clearances around the vehicle 115 and assign a high parking skills grade to the driver 110 of the vehicle 115 for using the wall 710 and the vehicle 730 rather than using the line 720 in this situation.

Figure 8:
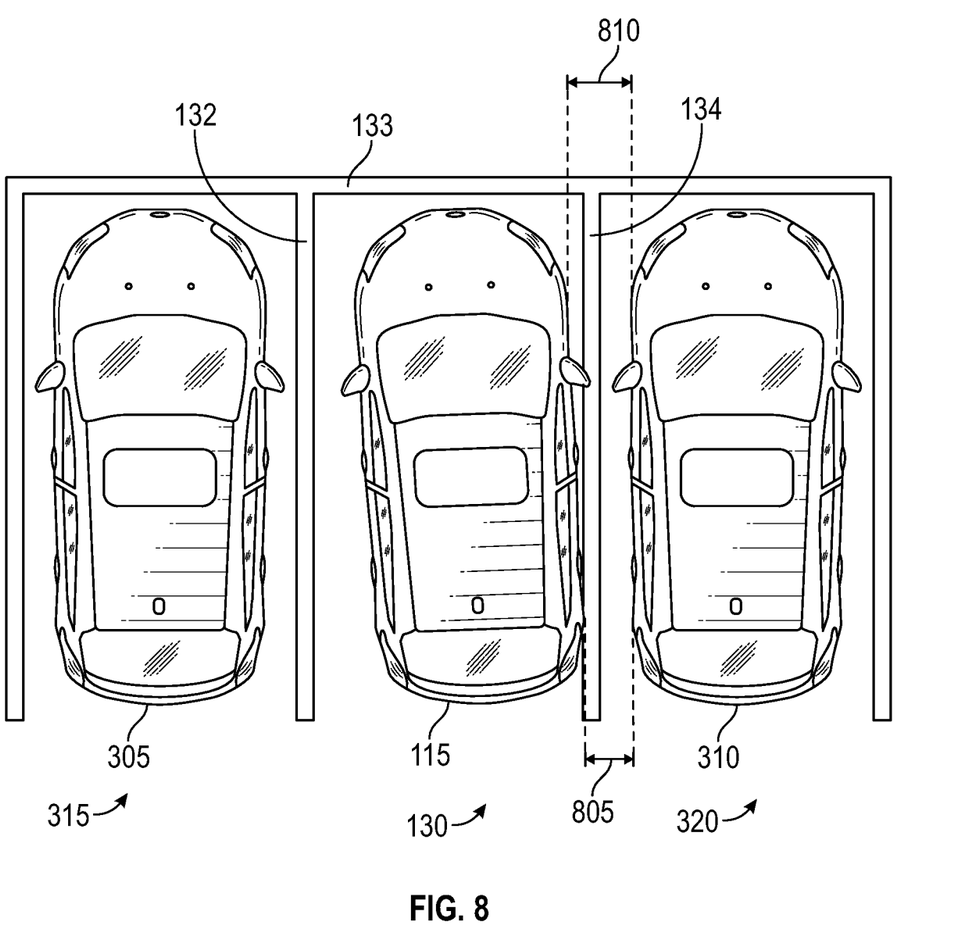
FIG. 8 shows a sixth exemplary parked condition that may be addressed by use of a parking skills improvement system in accordance with the disclosure.

FIG. 8 shows a sixth exemplary parked condition that may be addressed by use of a parking skills improvement system in accordance with the disclosure. In this sixth exemplary parked condition, the vehicle 115 is parked in the parking spot 130 between the vehicle 305 parked in the parking spot 315 that is adjacent to a first side of the parking spot 130 and the vehicle 310 parked in the parking spot 320 that is adjacent to a second side of the parking spot 130. The vehicle 115 has been parked angularly inside the parking spot 130 with a passenger side rear end of the vehicle 115 closer to the vehicle 310 than a passenger side front end of the vehicle 115. Consequently, a clearance 805 between the passenger side rear end of the vehicle 115 and the driver side rear end of the vehicle 310 is less than a clearance 810 between the passenger side front end of the vehicle 115 and the driver side front end of the vehicle 310. Furthermore, the passenger side rear end of the vehicle 115 is located above a portion of the line 134 instead of being located inside the parking spot 130 and away from the line 134.

The parking evaluation module 270 may process an image (or images) provided by the imaging system 105 to analyze the parked condition of the vehicle 115. Based on the analysis, which may involve determining various distance parameters (the clearance 805 and the clearance 810, for example), the parking evaluation module 270 may assign a low parking skills grade to the driver 110 of the vehicle 115.

In an exemplary implementation, and in view of the low parking skills grade that was assigned, the computer 120 may execute the coaching module 275 in order to offer coaching to the driver 110 for improving his/her parking skills. The execution of an exemplary coaching procedure by the coaching module 275 can include the coaching module 275 instructing the imaging system 105 to capture images of the parking spot 130 and objects located in the vicinity of the parking spot 130 (such as the curb 131, a car parked in an adjacent parking spot, and/or a building) over a period of time as the vehicle 115 is being maneuvered by the driver 110 into the parking spot 130. In one case, the captured images may be in the form of a video clip. The coaching module 275 may process the video clip to determine a trajectory of the vehicle 115 from a first location outside the parking spot 130 to a second location inside the parking spot 130. In one case, the second location inside the parking spot 130 can correspond to a spot where the vehicle 115 is stopped and the engine turned off. In another case, the second location inside the parking spot 130 can correspond to an intermediate spot prior to the spot where the vehicle 115 is finally stopped.

The trajectory of the vehicle 115 may provide various types of information pertaining to the parking skills of the driver 110. For example, the coaching module 275 may identify certain angles in the trajectory and/or driving characteristics of the driver 110 (speed, braking distance, etc.) when maneuvering the vehicle 115 into the parking spot 130. The coaching module 275 may then generate an idealized maneuvering sequence for maneuvering the vehicle 115 into the parking spot 130. A coaching video and/or coaching instructions may be generated based on the idealized maneuvering sequence and/or the actual maneuvering sequence followed by the driver 110.

The driver 110 may request the computer 120 to play the coaching video and/or to display the coaching instructions upon a device such as the infotainment system 121 or the smartphone 225. The driver 110 may then utilize the guidance provided in the coaching video to modify his/her driving when parking the vehicle in the parking spot 130 (a parking spot at his/her workplace, for example) or other parking spots. The driver 110 may be provided an option to replay the coaching video as many times as desired, and at various times, so as to observe changes to his/her parking skills grade.

In some implementations, the computer 120 may be configured to automatically offer various forms of incentives to motivate the driver 110 to improve his/her parking skills. For example, the computer 120 may suggest a threshold parking grade that the driver 110 may be capable of achieving, and display suitable guidance and/or messages (an encouraging message, a congratulatory message, etc.) to achieve the threshold parking grade. The guidance may be provided in various ways, such as in the form of audible messages when the driver 110 is pulling the vehicle 115 into a parking spot, or in the form of a video clip displayed on the infotainment system 121 and/or smartphone 225.

Figure 9:
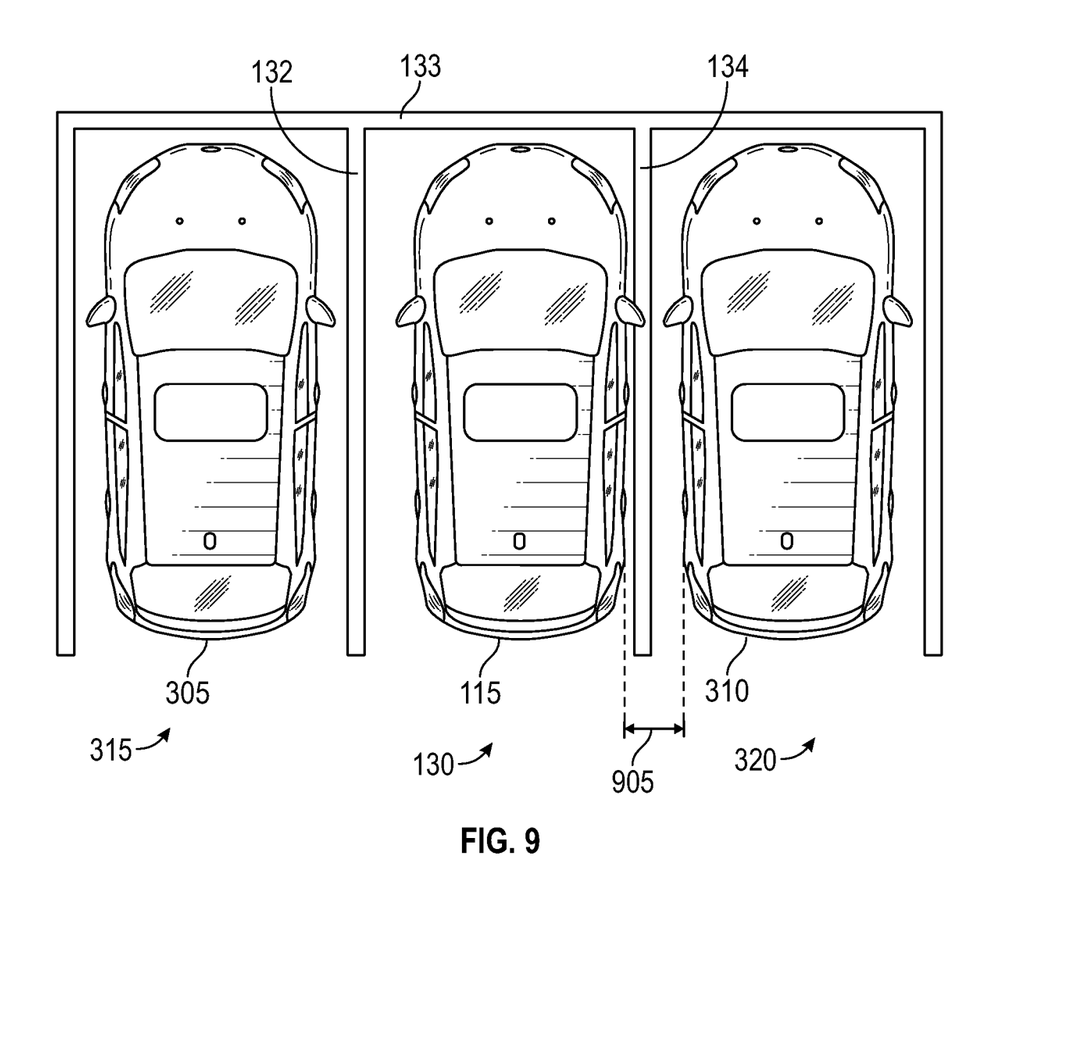
FIG. 9 shows a seventh exemplary parked condition that may be addressed by use of a parking skills improvement system in accordance with the disclosure.

FIG. 9 shows a seventh exemplary parked condition that may be addressed by use of a parking skills improvement system in accordance with the disclosure. In this seventh exemplary parked condition, the vehicle 115 is parked in the parking spot 130 between the vehicle 305 parked in the parking spot 315 that is adjacent to a first side of the parking spot 130 and the vehicle 310 parked in the parking spot 320 that is adjacent to a second side of the parking spot 130. The vehicle 115 has been parked undesirably close to the vehicle 310, and a part of the vehicle 115 (the passenger side mirror) is located above the line 134 of the parking spot 130. The clearance 905 between the passenger side of the vehicle 115 and the driver side of the vehicle 310 does not accommodate opening of a passenger door of the vehicle 115 without coming into contact with a driver side of the vehicle 310 or opening of a driver side door of the vehicle 310 without coming into contact with a passenger side of the vehicle 115.

In accordance with one of the exemplary methods described above, the parking evaluation module 270 may process an image (or images) provided by the imaging system 105 to analyze the parked condition of the vehicle 115 such as by measuring various distance parameters (the clearance 905, for example). Based on the analysis, the parking evaluation module 270 may assign a low parking skills grade to the driver 110 of the vehicle 115. The coaching module 275 may be executed as described above to improve the parking skills of the driver 110.

Figure 10:
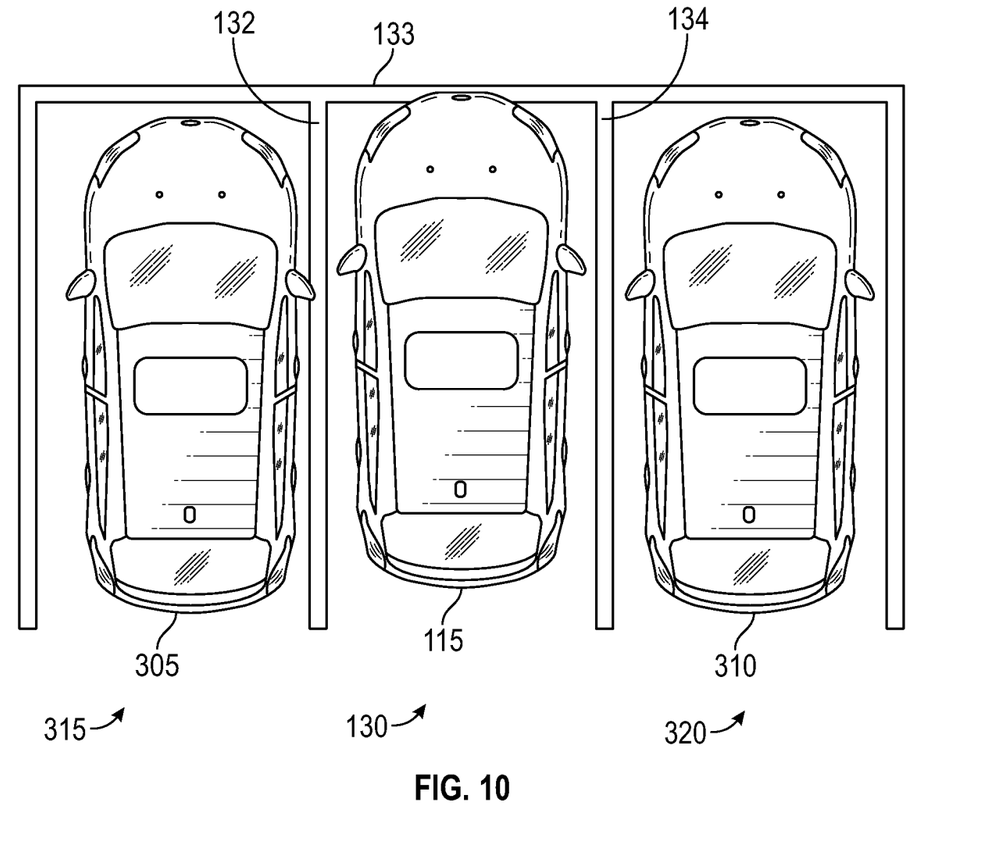
FIG. 10 shows a eighth exemplary parked condition that may be addressed by use of a parking skills improvement system in accordance with the disclosure.

FIG. 10 shows an eighth exemplary parked condition that may be addressed by use of a parking skills improvement system in accordance with the disclosure. In this eighth exemplary parked condition, the vehicle 115 is parked in the parking spot 130 between the vehicle 305 parked in the parking spot 315 that is adjacent to a first side of the parking spot 130 and the vehicle 310 parked in the parking spot 320 that is adjacent to a second side of the parking spot 130. The vehicle 115 has been pulled in too far into the parking spot 130. A front end of the vehicle 115 is located above the line 133 rather than behind the line 133 and inside the parking spot 130. In accordance with one of the exemplary methods described above, the parking evaluation module 270 may process an image (or images) provided by the imaging system 105 to analyze the parked condition of the vehicle 115 and assign a low parking skills grade to the driver 110 of the vehicle 115. The coaching module 275 may be executed as described above to improve the parking skills of the driver 110.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 260, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
capturing, when a first vehicle is parked in a first parking spot, an image or a video clip comprising at least one of a portion of the first vehicle, a second vehicle parked in a second parking spot, an object located outside the first parking spot, or a line that delineates a portion of the first parking spot;
determining, based on evaluating the image or the video clip, a distance parameter between a part of the first vehicle and the at least one of the second vehicle parked in the second parking spot, the object located outside the first parking spot, or the line that delineates the portion of the first parking spot; and
assigning a parking skills grade to a driver of the first vehicle based on at least the distance parameter.

2. The method of claim 1, further comprising:
determining, based on evaluating the image or the video clip, an angular orientation of the first vehicle with respect to the second vehicle parked in the second parking spot or the line that delineates the portion of the first parking spot.

3. The method of claim 1, wherein the image or the video clip is captured by an imaging system of the first vehicle.

4. The method of claim 3, wherein the imaging system comprises at least one of a first camera mounted upon a top surface of a roof of the first vehicle, a second camera mounted upon a bottom surface of a floor of the first vehicle, or a 360-degree camera system.

5. The method of claim 3, wherein the second parking spot is located adjacent to the first parking spot and wherein the object located outside the first parking spot is a curb, a portion of a building, or a fixture.

6. The method of claim 5, wherein the distance parameter is a distance between a part of the first vehicle and the object located outside the first parking spot.

7. The method of claim 3, wherein the method further comprises:
using the imaging system to capture the video clip when the driver is maneuvering the first vehicle into the first parking spot; and
identifying a first maneuvering sequence of the driver when maneuvering the first vehicle into the first parking spot.

8. The method of claim 7, further comprising:
generating an idealized maneuvering sequence for maneuvering the first vehicle into the first parking spot; and
producing a coaching video based on at least one of the idealized maneuvering sequence or the first maneuvering sequence of the driver.

9. A computer mounted in a first vehicle, the computer comprising:
a memory that stores computer-executable instructions; and
a processor configured to access the memory and execute the computer-executable instructions to at least:
capture, when the first vehicle is parked in a first parking spot, a first image or a first video clip at least one of a portion of the first vehicle, a second vehicle parked in a second parking spot, an object located outside the first parking spot, or a line that delineates a portion of the first parking spot;
determine, based on evaluating the first image or the first video clip, a distance parameter between a part of the first vehicle and the at least one of the second vehicle parked in the second parking spot, the object located outside the first parking spot, or the line that delineates the portion of the first parking spot; and
assign a parking skills grade to a driver of the first vehicle based on at least the distance parameter.

10. The computer of claim 9, wherein the processor is further configured to access the memory and execute additional computer-executable instructions to at least:
determine, based on evaluating the first image or the first video clip, an angular orientation of the first vehicle with respect to the second vehicle parked in the second parking spot or the line that delineates the portion of the first parking spot.

11. The computer of claim 10, wherein the second parking spot is located adjacent to the first parking spot and wherein the object located outside the first parking spot is a curb, a portion of a building, or a fixture.

12. The computer of claim 9, wherein the processor is configured to control an imaging system of the first vehicle for capturing the first image or the first video clip.

13. The computer of claim 12, wherein the imaging system comprises at least one of a first camera mounted upon a top surface of a roof of the first vehicle, a second camera mounted upon a bottom surface of a floor of the first vehicle, or a 360-degree camera system.

14. The computer of claim 12, wherein the processor is further configured to access the memory and execute additional computer-executable instructions to at least:
use the imaging system to capture the first image or the first video clip when the driver is maneuvering the first vehicle into the first parking spot; and
identify a first maneuvering sequence of the driver when maneuvering the first vehicle into the first parking spot.

15. The computer of claim 14, wherein the processor is further configured to access the memory and execute additional computer-executable instructions to at least:
generate an idealized maneuvering sequence for maneuvering the first vehicle into the first parking spot; and
produce a coaching video based on the idealized maneuvering sequence or the first maneuvering sequence of the driver.

\* \* \* \* \*